United States Patent
Kizilos

[15] 3,686,951
[45] Aug. 29, 1972

[54] DIGITAL ABSOLUTE PRESSURE RATIO INDICATOR

[72] Inventor: Apostolos P. Kizilos, Minnetonka, Minn.

[73] Assignee: Honeywell Inc., Minneapolis, Minn.

[22] Filed: Sept. 2, 1970

[21] Appl. No.: 68,912

[52] U.S. Cl. .............................................73/388 R
[51] Int. Cl. ................................................G01l 7/00
[58] Field of Search............73/388 R, 407; 137/81.5; 235/201

[56] References Cited

UNITED STATES PATENTS 2,052,869  9/1936  Coanda..................235/200 PF

*Primary Examiner*—Donald O. Woodiel
*Attorney*—Charles J. Ungemach and Ronald T. Reiling

[57] ABSTRACT

A pressure ratio indicator used to determine the ratio of a first and second fluid pressure. The indicator consists of a plurality of curved wall-orifice arrangements of varying parameters and a fluid detector for each arrangement. A jet of fluid issuing from the orifice will be made to have, for each successive curved wall-orifice arrangement, an increasing tendency to detach from the wall. The attachment of the jet to the wall will be detected by a first set of detectors and will not be detected by a second set of detectors since separation has occurred prior to reaching these detectors, so that the pressure ratio is determined to be a value greater than that necessary to cause flow to exist at the first set of fluid detectors which are detecting flow, but less than the value necessary to cause flow to exist at the second set of fluid detectors which are not detecting flow.

4 Claims, 5 Drawing Figures

Patented Aug. 29, 1972

INVENTOR.
APOSTOLOS P. KIZILOS

BY Charles J. Ungemach

ATTORNEY

INVENTOR.
APOSTOLOS P. KIZILOS

BY Charles J. Ungemach

ATTORNEY

DIGITAL ABSOLUTE PRESSURE RATIO INDICATOR

BACKGROUND OF THE INVENTION

1. Field of the Invention

The present invention pertains to fluid pressure ratio indicators. More specifically, the invention pertains to pressure ratio indicators which employ a plurality of Coanda surfaces.

2. Description of the Prior Art

Mechanical and electro-mechanical pressure ratio measuring devices are well known in the art. Mechanical pressure ratio devices usually measure the pressure ratio by comparing forces. Electromechanical devices generally employ a piezoelectric crystal in order to produce AC output signals. Some devices are based on the fact that when two separate sources of fluid are connected to respective chambers which have their volumes cyclically varied, (the volumes are cyclically varied in order that a piezo-electric crystal can respond to fluctuations in a diaphragm between the two chambers) the ratio of the pressure of one source to the pressure of the other source will be proportional to the ratio of the quiescent volume of one chamber to the quiescent volume of the other chamber.

These prior art devices tended to be complex and costly. The present invention does not employ moving parts and thus solves many of the problems of the prior art.

BRIEF SUMMARY OF THE INVENTION

The present invention comprises a pressure ratio indicator used to determine the ratio of a supply pressure to an ambient pressure. The indicator consists of a series of curved walls at an ambient pressure upon which jets of supply fluid tend to attach according to the Coanda effect after the jets have issued from orifices near the curved walls. The orifices allow the supply fluid to flow a plenum chamber where the fluid is contained at a supply pressure. Fluid flow detectors which are located on each curved wall at a particular angle around each curved wall from the orifice detect the presence or absence of fluid flow. When a series of detectors are indicating flow and the next series of detectors are not indicating flow the pressure ratio will be a value greater than that necessary to cause flow to the detectors which are sensing flow, but less than the value necessary to cause flow to the next successive fluid detector which is not sensing flow.

Instances where a pressure ratio switch type of device is useful include bypass engines to prevent surges and Mach number trimming. In addition, a VDT at the trailing edge of helicopter blades or in fixed wing aircraft may require the present invention to detect large VDT supply pressures in order to prevent detachment of the VDT jet.

DESCRIPTION OF THE PREFERRED EMBODIMENT

Figure 1:
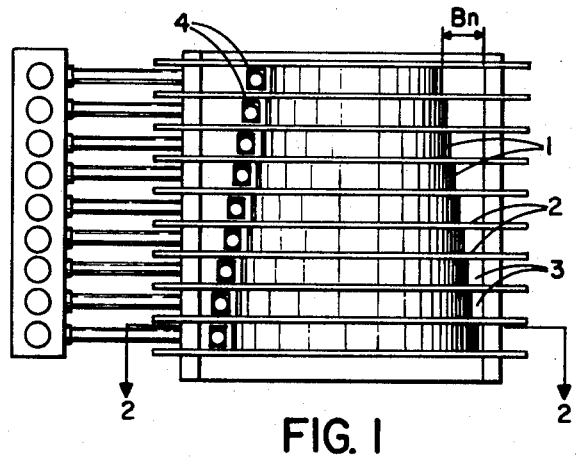
FIG. 1 is an illustration of a preferred embodiment of the digital absolute pressure ratio indicator according to the present invention.

Referring to FIG. 1, a series of Coanda cylinders 1 are separated by divider plates 2. Each Coanda cylinder 1 has associated with it an orifice 3, having different widths $B_n$, and a fluid detector 4.

Figure 2:
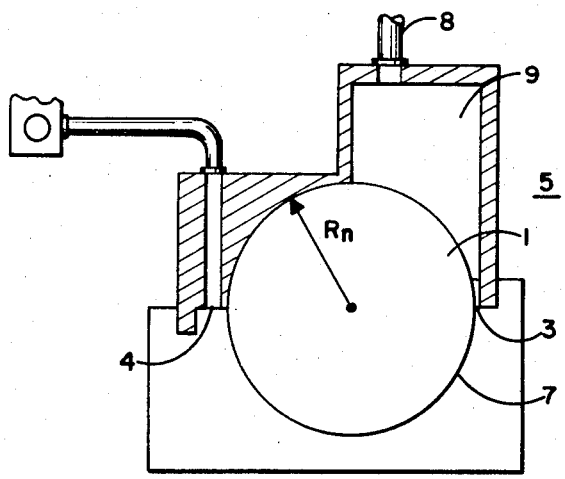
FIG. 2 illustrates a single layer of the preferred embodiment.

Referring to FIG. 2, a single Coanda arrangement 5 is shown. FIG. 2 is a view of one layer of FIG. 1 looking downward. Each Coanda arrangement 5 consists of a Coanda cylinder 1, an orifice 3, and a fluid flow detector 4. While there are many types of fluid flow detectors, the present invention may employ the type shown in the Sher et al. U.S. Pat. No. 3,357,638 or the Merrill U.S. Pat. No. 3,368,751, both assigned to the assignee of the present invention. Coanda cylinder 1 has a curved wall 7 having a radius of curvature $R_n$. Fluid at supply pressure $P_s$ is provided through conduit 8 into plenum chamber 9 and then through orifice 3 and onto curved wall 7 for attachment thereto. All Coanda arrangements 5 are preferably supplied with fluid at the pressure $P_s$. Curved wall 7 is submersed in fluid having a second pressure which may be the ambient pressure and will be referred to herein as $P_{ambient}$. The presence of fluid at curved wall 7 is detected by fluid flow detector 4 which is located around the curved wall 7 at some angle, where the angle is defined as existing between the line drawn from the center of the Coanda cylinder 1 to the orifice 3 and the line drawn from the center of the Coanda cylinder 1 to any point on the curved wall 7. The fluid detector is shown located at an angle of 180° in FIG. 2.

Figure 3:
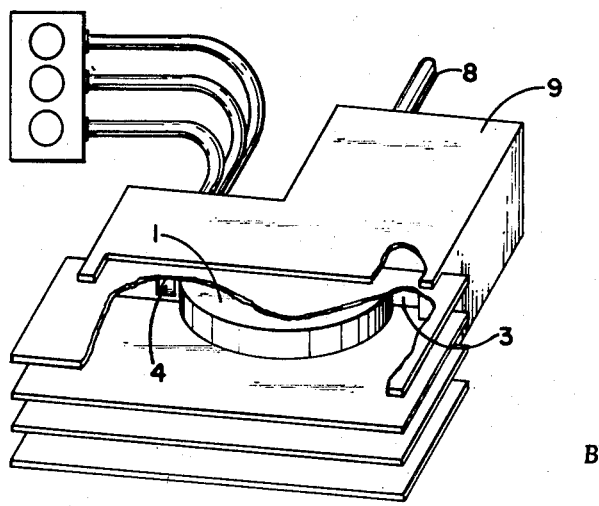
FIG. 3 is a cut-away view of three layers of the preferred embodiment.

FIG. 3 is provided in cut-away in order to further illustrate the relation between the series of Coanda cylinders 1, orifice 3, plenum chamber 9, and fluid detector 4.

The tendency of fluid streams issuing from orifices to attach themselves to adjacent curved walls and to detach from the wall at some later point is essential to the operation of this mechanism. This tendency is known as the Coanda effect and is described in the Henri Coanda U.S. Pat. No. 2,052,869. It is known in the art that for low fluid pressures the distance around the curved wall which the fluid stays attached, for a particular fluid, is dependent upon the pressure surrounding the curved wall, the pressure of the supply fluid which attaches to the wall, the size of the orifice through which the supply pressure flows in order to reach the curved wall, and the radius of curvature of the curved wall. The present invention employs the additional fact that for increasing ratios of the supply pressure to the ambient pressure the fluid will continue to detach at substantially the same point until a sufficiently high ratio of these pressures is reached at which time the fluid will completely detach from the curved wall.

Figure 4:
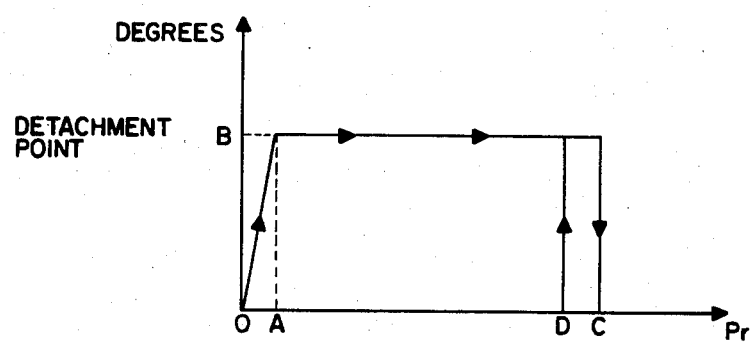
FIG. 4 shows the fluid detachment point as a function of the pressure ratio.

FIG. 4 illustrates that for a fixed Coanda arrangement, [that is, a particular orifice width to curved wall radius of curvature $(B_n)/R_n$] the point of detachment from the curved wall for a particular fluid, is dependent upon the pressure ratio $P_r$ which is defined as the ratio of the supply pressure to the ambient pressure. It can be seen that the point of detachment moves rapidly around the surface until a pressure ratio of A is reached. At the pressure ratio A, which may be approximately 1.2, a point of detachment is reached which is identified in FIG. 4 as having a value of B. The value of B may be approximately 240°. On further increasing the pressure ratio from A the fluid continues to detach at approximately the same point B on the curved wall. When $P_r$ is increased to a value of C the fluid completely detaches from curved wall 7. That is, instead of the fluid remaining attached at point B on the cylinder, the fluid now detaches completely from the cylinder at 0°. A further increase in the pressure ratio will continue to leave the fluid unattached. If the pressure ratio is decreased it remains unattached until point D is reached at which point the fluid reattaches. The hysteresis loop can be reduced in magnitude by causing the fluid flow to be more turbulent.

Figure 5:
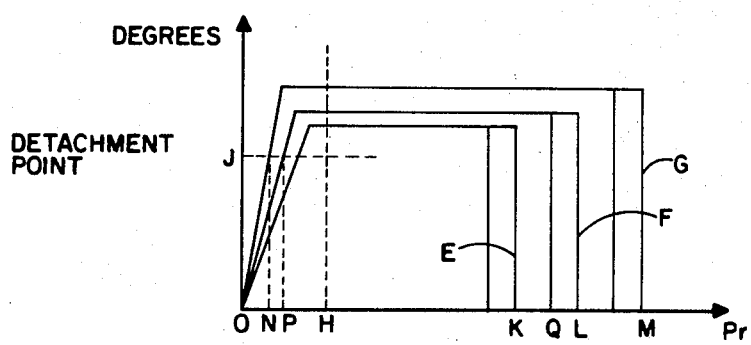
FIG. 5 shows a plurality of curves for the fluid detachment point as a function of pressure ratio for various orifice width to curved wall radius of curvature ratios.

FIG. 5 shows typical curves E, F, and G for three different orifice width-to-curved wall radius of curvature ratios $(B_n)/(R_n)$. FIG. 5 shows that for a higher pressure ratio than H and with fluid flow detectors placed at a given angle of J, where J may be approximately 180° as in FIG. 2 (although it is to be noted that the detectors could be placed at other positions adjacent surface 7 so long as the position is greater than 0°), the fluid will be either attached to or detached from each Coanda arrangement's curved wall 7 depending on whether $P_r$ values greater than K, L, and M have been attained.

Referring again to FIGS. 1 and 2, for each Coanda arrangement 5, fluid at pressure $P_2$ is ejected through its orifice 3. The fluid will attach to the curved wall 7 and later separate at some point. For each Coanda arrangement 5, the supply pressure $P_s$ and the surrounding pressure $P_{ambient}$ will remain nearly identical. However, each successive curved wall arrangement is constructed so that a graduated orifice width to radius of curvature ratio $(B_n)/(R_n)$ exists. This creates an increasing tendency for the fluid to detach prior to reaching the fluid detectors which are placed at some angle around surface 7 such as 180°. This can be seen by referring to points M, L, and K on FIG. 5. Referring again to FIG. 5, in operation, when the set of fluid detectors with $B_n/R_n$ values of G and less are detecting flow, it is known that the pressure ratio must be less than M, and when the next successive fluid detector with $B_n/R_n$ of F is not detecting flow it is known that the pressure ratio must be greater than the reattachment point Q for curve F. As the hysteresis loop is decreased in magnitude it would be known that the pressure ratio would be greater than L. Thus, it would be determined that the pressure ratio lies between L and M. With small enough increments of $B_n/R_n$, considerable accuracy can be obtained in determining the pressure ratio.

This explanation is for the situation when there is a decreasing as well as increasing pressure ratio. In order to eliminate the effect of the hysteresis loop on the operation of the device with decreasing pressure ratios a device could be employed which switches the supply pressure off and on more rapidly than fluctuations in pressure ratio. This would allow one to predict the pressure between two points such as L and M on FIG. 5 more accurately. If the device is used in a situation where the only concern is with increasing is with increasing pressure ratios, such as with a VDT on an aircraft wing to alert the pilot as to high supply pressures, then the hysteresis loop is not of concern.

The preceding operation explains the use of the preferred embodiment for pressure ratios greater than the low ratios where complete attachment has not yet occurred, that is, for pressure ratios greater than H as shown in FIG. 5. It is to be understood that the embodiment can also measure ratios in the area of pressure ratios less than H. For example, if the fluid detectors 4 are placed at some angle on their surfaces 7, again for example, an angle J on FIG. 5 (approximately 180°) and the fluid detector associated with Coanda arrangement G was experiencing flow but the fluid detector associated with the Coanda arrangement F, (the next successive fluid detector), was not experiencing flow, the pressure ratio would be determined to be greater than N but less than P.

Many modifications, variations, and embodiments are possible within the scope of this invention. For example, it is not necessary that the curved wall 7 be circular such that there exist some fixed radius of curvature. All that is necessary is that there be a curved wall with some parameter in order for the Coanda effect to occur and in order that curves such as those shown in FIG. 5 can be generated for the particular embodiments. Also, it is to be noted that the ratio $B_n/R_n$ can be changed for each Coanda arrangement by varying both $B_n$ and $R_n$ or varying them singularly. Other variations will occur to those skilled in the art. It is, therefore, understood that this particular embodiment shown here is for illustration purposes only and that the present invention is limited only by the scope of the appended claims.

I claim as my invention:

1. Apparatus for measuring the pressure ratio of a first pressure and a second pressure, comprising:

a plurality of Coanda arrangements having a curved wall submerged in a fluid at said first pressure and means defining an orifice for issuing a fluid at said second pressure onto said wall for attachment thereto;

fluid detection means located along said curved wall for each Coanda arrangement and adapted to detect the presence of fluid attached to said curved wall at a specific point thereon, said fluid detection means being positioned to detect the presence of fluid at a known maximum pressure ratio for each Coanda arrangement, said known maximum ratio being different for each Coanda arrangement; and means for indicating the maximum known pressure ratio at which fluid is detected by said fluid detection means, and the minimum known pressure ratio at which fluid is not detected by said fluid detection means;

whereby, the value of the pressure ratio of the first and second pressure will be between said maximum known ratio and said minimum known ratio.

2. The apparatus of claim 1 wherein each Coanda arrangement has a different radius of curvature of its respective curved wall, whereby each Coanda arrangement will have a different maximum known pressure ratio.

3. The apparatus of claim 1 wherein each Coanda arrangement has a different size of the orifice, whereby each Coanda arrangement will have a different known maximum pressure ratio.

4. The apparatus of claim 1 wherein said fluid detection means is located at a different point along the curved wall for each Coanda arrangement whereby each Coanda arrangement will have a different maximum pressure ratio.

* * * * *